United States Patent [19]

Stemme et al.

[11] 4,330,793

[45] May 18, 1982

[54] ELECTRONIC SCANNING OF SUPER-8 FILMS FOR REPRODUCTION ON A T.V. VIEWING UNIT

[75] Inventors: Otto Stemme, Munich; Eduard Wagensonner, Aschheim; Wolfgang Ruf, Munich, all of Fed. Rep. of Germany

[73] Assignee: AGFA-Gevaert Aktiengesellschaft, Leverkusen, Fed. Rep. of Germany

[21] Appl. No.: 56,789

[22] Filed: Jul. 11, 1979

[30] Foreign Application Priority Data

Jul. 17, 1978 [DE] Fed. Rep. of Germany ....... 2831296

[51] Int. Cl.³ .................... H04N 9/11; H04N 9/07; H04N 3/08
[52] U.S. Cl. .................................. 358/56; 358/44; 358/216; 358/208
[58] Field of Search .................. 358/41, 43, 44, 54, 358/48, 212–216, 293, 294, 75, 6; 357/24, 30

[56] References Cited

U.S. PATENT DOCUMENTS

| Re. 29,807 | 10/1978 | Metzger | 358/216 |
|---|---|---|---|
| 2,827,512 | 3/1958 | Stahl et al. | 358/44 |
| 2,993,403 | 7/1961 | Harries | 358/208 |
| 3,770,890 | 11/1973 | Winkler | 358/208 |
| 3,952,328 | 4/1976 | Biber | 358/54 |
| 3,958,210 | 5/1976 | Levine | 357/24 |
| 4,001,878 | 1/1977 | Weimer | 357/24 |
| 4,148,071 | 4/1979 | Zinchuk | 358/214 |
| 4,153,912 | 5/1979 | Gold | 358/44 |

OTHER PUBLICATIONS

Childs et al., "An Experimental Telecine Using a Line-Array CCD Sensor", SMPTE Journal, vol. 87, No. 4, Apr. 1978, pp. 209–213.

Sequin et al., Charge Transfer Devices, Academic Press, Inc. New York, 1975, pp. 216–217.
Noll, Television for Radiomen, The Macmillan Company, 1955, pp. 30, 31.
Poetsch, "A Continuous–Motion Color Film Telecine Using CCD Line Sensors,". SMPTE Journal, vol. 87, Dec. 1978, pp. 815–820.

Primary Examiner—John C. Martin
Attorney, Agent, or Firm—Michael J. Striker

[57] ABSTRACT

Super-8 motion-picture film is transported non-intermittently at constant speed, and its image is projected into an image plane in which is located a single row of photodiodes which extends transverse to the film transport direction. The photodiodes of the single photodiode-row are successively responsive to red, blue and green wavelengths. A bucket-brigade circuit or CCD including the photodiode-row furthermore includes a shift register which receives the photodiode signals in parallel, is then read out serially, with its output signal then time-division demultiplexed to obtain separate red, blue and green signals; or else three shift registers are used, each receiving signals only from those photodiodes responsive to a respective one of the three component colors. Whereas the photodiode-row is responsible for horizontal scanning, vertical scanning is achieved in part due to film transport per se and in part due to a tilting-mirror deflector which deflects the image projected onto the photodiode-row. The tilting-mirror deflector is a galvanometric moving-coil mechanism, and is energized by a sawtooth waveform to effect forwards scanning and abrupt vertical-direction flyback or tiltback, and is provided with special brief pulses for effecting abrupt direction reversals of the tilting mirror.

11 Claims, 9 Drawing Figures

ELECTRONIC SCANNING OF SUPER-8 FILMS FOR REPRODUCTION ON A T.V. VIEWING UNIT

BACKGROUND OF THE INVENTION

The present invention concerns systems for the electronic scanning of film for reproduction on T.V. viewing units, of the type provided with a continuously operating projection system for the film, a bucket-brigade circuit or charge coupled device (CCD) having a row of photodiodes which extends transverse to the film-transport direction and is located in the image plane of the film projection system, and circuitry for converting the signals obtained from the bucket-brigade circuit (CCD) into actual television signals.

In one known system for the electronic scanning of Super-8 films for reproduction on a T.V. viewing unit, disclosed in the German periodical "Funkschau," 1974, Volume 9, pp. 292-298, the scanning of the photographic film is performed using a scanning tube. To generate the red, blue and green component signals needed for the operation of a color-T.V. picture tube, use is made of a beam-splitting attachment comprised of two dichroic mirrors and three color filters cooperating with three photomultipliers. The mechanical components of the system are expensive.

In principle, if only the generation of a picture signal for a black-and-white T.V. receiver is involved, it is possible to dispose in the image plane of the film projection objective a bucket-brigade circuit (CCD=charge coupled device) with a row of photodiodes extending transverse to the film-transport direction and comprised of a single row of image-sensing elements. However, hitherto the development of signals for color T.V. has not been achievable utilizing such an approach.

SUMMARY OF THE INVENTION

It is a general object of the invention to provide a system of the type identified above for the scanning of, most especially, Super-8 film, of such a design as to make possible in a simple way the generation of a color-T.V. picture signal for reproduction on a color-T.V. viewing unit.

In the preferred embodiments of the invention, the row of photodiodes or other image sensing elements referred to above is constituted by groups of three photodiodes each, the three photodiodes of each group being respectively responsible for the detection of the red, blue and green image content of one associate image point or image element, with the three photodiodes or other such image-sensing elements of each three-element group being located in a succession extending in the same direction as the direction in which extends the photodiode row constituted by such three-photodiode groups, i.e., using a single row of photodiodes for the three color components, connected to a register device.

In this way only one single row of photodiodes, or the like, is needed in the bucket-brigade circuit for the generation of a color-T.V. picture signal, although to achieve an image resolution equal to that of a given comparable black-and-white system use is made of three times as many photodiodes in the photodiode-row.

Actually, the separation of the three color components of each point or element of the film image using three associated image-sensing elements which succeed each other in the direction of the element-row is, in a positive sense, particularly well suited for modern in-line T.V. picture tubes, in which the three color constituents of each image point or image element are likewise reproduced in a row.

The parallel transmission of the individual signals produced by the elements of the photoelement-row to the register device, and the serial charge transport of the signals registered by the register device to the output of the register device yields, at the latter, an electronic signal corresponding to one T.V.-image line. To obtain all the T.V.-image lines needed for reproduction of a complete T.V. image the projected image of the film is moved relative to the photoelement-row, this relative displacement being controlled in synchronism with the vertical frequency of the T.V. image to be produced.

Advantageously, the register device comprises an analog shift register, to respective individual shift-register stages of which the individual photoelements of the photoelement-row are connected via respective storage capacitors, with the output of the analog shift register being connected to a time-demultiplexing circuit. The time-demultiplexing circuit then separates from one another the red, green and blue color components signals. This system configuration has the considerable practical advantage of utilizing one simple analog shift register, but has the practical disadvantage of requiring a relatively high clocking frequency for driving the shift register for read-out.

In accordance with an alternative system configuration contemplated by the present invention, use is made of three analog shift registers. The individual shift-register stages of each individual one of the three shift registers are connected to individual respective ones of those of the photoelements in the photoelement-row associated with one respective color component, so that three color component signals are obtained directly at the outputs of respective ones of the three analog shift registers. Such a system configuration places high demands upon the IC production techniques employed when the three analog shift registers are to be provided on a single CCD-chip, but the required clocking frequency is only one third of that of the other system configuration just discussed.

The image-sensing elements of the photoelement-row are advantageously made responsive to different respective ones of the three color components by deposition of differing respective interference layers in correspondence to the usual mask production technique employed in IC fabrication.

Alternatively, the photoelements of the photoelement-row are made responsive to different respective ones of the three color components by locating in front of them a stripe filter whose constituent elements respectively transmit only the wavelengths for the requisite blue, red and green color components.

A transfer gate is advantageously connected between the image-sensing elements of the photoelement-row and the register(s) for parallel transmission of the charges from the former to the latter.

In a particularly preferred embodiment of the invention, the film projection system comprises a deflection mirror system provided in the form of a tilting mirror system, operative for deflecting the projected image of the film at a velocity which takes into account the film-transport speed and provides the vertical repetition frequency needed for a standard T.V. picture system (50 Hz in European systems).

In accordance with a preferred concept of the present invention the range of deflection provided by the deflection mirror system corresponds, for example, to two-thirds the total vertical-direction length of the film frame being scanned, with the film transport itself serving, to the remaining extent, to bring all portions of the film image into the vertical-scanning range at the proper times.

The tilting mirror system can be taken right out of a galvanometric system, although slight structural modifications may be necessary with regard to the magnetic system thereof. Such tilting mirror systems fulfill very well the high demands placed upon a film-scanning system with regard to precise controllability of deflection.

Advantageously, the tilting mirror system may comprise a moving-coil deflector from galvanometer technology. The moving-coil deflector of the tilting mirror system is advantageously powered by an additive logic circuit through the intermediary of an amplifier.

In a preferred embodiment, in order that a system of the type discussed above be able to comprise a large-surface-area galvanometric tilting mirror with limit frequencies in the vicinity of the period of the deflection frequency, use is advantageously made of an electronic control circuit which comprises a first pulse-former stage controlled by a sawtooth generator operative during the return or drop-back flank of the sawtooth voltage for supplying a brief return-motion accelerating pulse, the control circuit furthermore comprising a second pulse-former stage likewise controlled by the sawtooth generator and operative for supplying a brief pulse which serves to brake the return motion of the tilting mirror and to accelerate the mirror for the next actual scanning motion, with the sum of the durations of the two pulses not exceeding the vertical blanking interval of whatever T.V. standard is involved. Advantageously, the additive logic circuit is provided with adjusters for adjustment of the sawtooth-voltage amplitude and the amplitudes of the aforementioned two pulses all independently of one another.

Advantageously, the sum of the durations of the two brief pulses mentioned above does not exceed 1.2 msec, especially in the case of European standards.

By so designing the system, and despite the use of a tilting mirror of relatively large surface area, the flyback time of the mirror plus the duration of its transient-response movement upon the commencement of its next scanning sweep terminates after at most 1.2 msec. The tilting or vibrating mirror system displaces the projected image of the film frame in the vertical scanning direction with a repetition frequency corresponding to that of the T.V. standard involved, 50 Hz in the case of European standards. In general the total flyback or tiltback between the scanning of one film frame and the scanning of the next film frame should, at most, correspond to the vertical blanking time of the T.V. standard involved, e.g., 1.2 msec. The upper limit frequency of the tilting mirror system should be so selected that the total tiltback time interval must necessarily end within, e.g., 1.2 msec. In the case of a critically damped galvanometric system, this would occur after a time interval of $1/f_o$, $f_o$ being the resonant frequency of the galvanometric tilting mirror system. However, most ganvanometric movements are designed with a damping factor of 0.7, i.e., to permit a small amount of overshoot, as a result of which the transient behavior of the movement terminates only after a time of about $1.5/f_o$. If a maximum time of 1.2 msec is to be permitted, this means that the minimum resonant frequency required for the galvanometric movement is to be $$f_{min} = 1.5/1.2 \text{ sec} = 1.25 \text{ kHz}.$$

In a preferred embodiment, the first pulse-former stage, whose pulse implements the flyback or tiltback of the mirror, is comprised of a monostable circuit; the second pulse-former stage, whose pulse brakes the flyback and accelerates the mirror for resumption of scanning motion, comprises two monstable circuits; and the time of occurrence and also the duration of the output pulses are each adjustable independently of each other by means of potentiometers.

This technique makes for a very simple electronic control circuit, which does not require the use of sophisticated and costly negative-feedback control actions, i.e., not requiring the use of a feedback transducer comprising a moving element which shares the motion of the mirror and furnishes a position feedback signal indicating the instantaneous position of the deflecting mirror, with the position feedback signal being applied to a comparator and the difference between the feedback signal and an instantaneous-position command signal being used to generate an error signal and then an actuating signal for negative-feedback control of the instantaneous mirror position and/or speed, etc. The avoidance of such negative-feedback action, and of negative-feedback actions even more non-elementary, avoids the various problems which the time-constants of such negative-feedback actions would introduce into the scanning problem.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
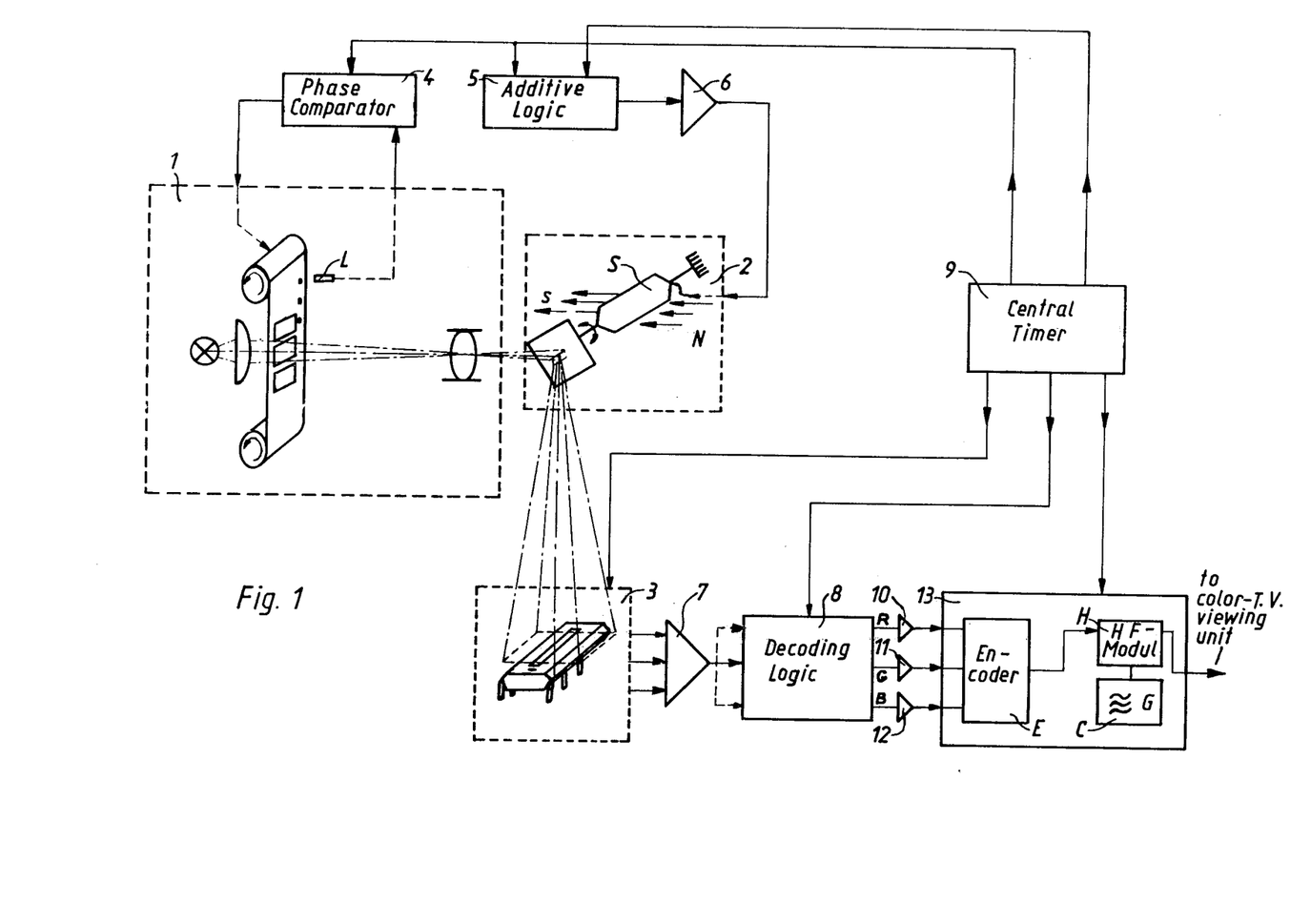
FIG. 1 is a schematic overall view of an electronic film scanning system embodying the invention.

FIG. 1 is a schematic overall depiction of a system for the electronic scanning of Super-8 film for the generation of a color-T.V. signal reproducible on a color-T.V. viewing unit. The scanning system includes an illumination and film-transport system 1 for the Super-8 film and includes a projection objective. Numeral 2 denotes a tilting mirror deflection system participating in the establishment of what film image line is to be scanned at any given moment. Numeral 3 denotes an image-sensing system comprised of a bucket-brigade circuit or charge-coupled device (CCD) comprising a single row of photodiodes operative for resolving the light from respective image points of a scanned line into three color components and furthermore provided with image-signal processing circuitry described further below.

The illumination and film-transport system 1 is controlled by a phase comparator 4. The tilting mirror deflection system 2 comprises a galvanometric moving-coil vibrator S driven by an incremental logic circuit 5 through the intermediary of an amplifier 6.

Connected to the output of the image-sensing system 3 is an amplifier 7, to whose output is connected a decoding logic circuit 8. The decoding logic circuit 8 has three outputs at which are respectively furnished the red, green and blue color component signals of the system. These color component signals are transmitted via respective amplifiers 10, 11 and 12 to an encoding unit 13. Encoding unit 13 comprises an encoder E for converting the three color-component signals into appropriate superimposed luminance and chrominance signals and for applying to the color-T.V. picture signal thusly generated the various synch signals needed to form a complete composite color-T.V. signal, the encoder 3 cooperating with an HF modulator H and with a high-frequency signal source C. The output of encoding unit 13 is connected to a color-T.V. viewing unit.

A central timing unit 9 supplies the various synchronizing and clock signals needed by the phase comparator 4, the additive logic circuit 5, the image-sensing system 3, the decoding logic circuit 8 and the encoding unit 13.

The illumination and film-transport system 1 is like that of an ordinary Super-8 film projector, with certain exceptions. In system 1, the film is transported continuously, i.e., not with the intermittent action of a motion-picture projector, by means of a capstan or a gear which engages into the film's perforations. The film is transported at constant speed, and a light detector L senses the film's perforations to periodically inform the phase comparator 4 of any phase error which may be developing between the phase of the constant-speed film transport action and the synchronizing signals which are applied to the additive logic circuit 5 for the driving of the tilting mirror deflection system 2, i.e., so that phase-correction action be initiated.

For purposes of the electronic scanning here in question, the film-transport speed does not correspond to the usual 18 or 24 frames/sec, but instead is an integral fraction of the vertical frequency of the T.V. standard involved; it is assumed herein that a European standard is involved, with a vertical frequency of 50 Hz, in which case the film-transport speed would be 25 frames/sec or 16-⅔ frames/sec. The small speed-up of the motion-picture image (e.g., 25 are compared to a normal 24 frames/sec) or the small slow-down of the image (e.g., 16-⅔ as compared to 18 frames/see) will be acceptable for many applications.

The tilting mirror deflection system 2 displaces the projected image of the film frame in the vertical-scanning direction with the repetition frequency needed for the relevant T.V. standard, here 50 Hz. The flyback or tiltback time between successive film frames is to be permitted to amount to at most the vertical blanking time of the T.V. standard employed, here 1.2 msec. Tilting mirror systems from galvanometric applications are suitable for such purposes. The upper limit frequency of such a galvanometric tilting mirror deflection system should be so selected that the flyback or tiltback time plus the transient which occurs at the end of the latter upon resumption of forwards-scanning motion not require more than 1.2 msec. In the case of a critically damped galvanometric tilting mirror system, this would require a time of $1/f_o$, $f_o$ being the resonant frequency of the galvanometric system. Because most such ganvanometric systems are designed to have a damping factor of 0.7, i.e., permitting a small amount of overshoot, the transient response referred to above would not be finished until after $1.5/f_o$. In that event, the minimum resonant frequency of the galvanometric system selected would need to be $$f_{min} = 1.5/1.2 \text{ msec} = 1.25 \text{ kHz}.$$

It is to be noted that galvanometric tilting mirror systems are widely available commercially with resonant frequencies up to as high as 15 kHz.

Figure 2:
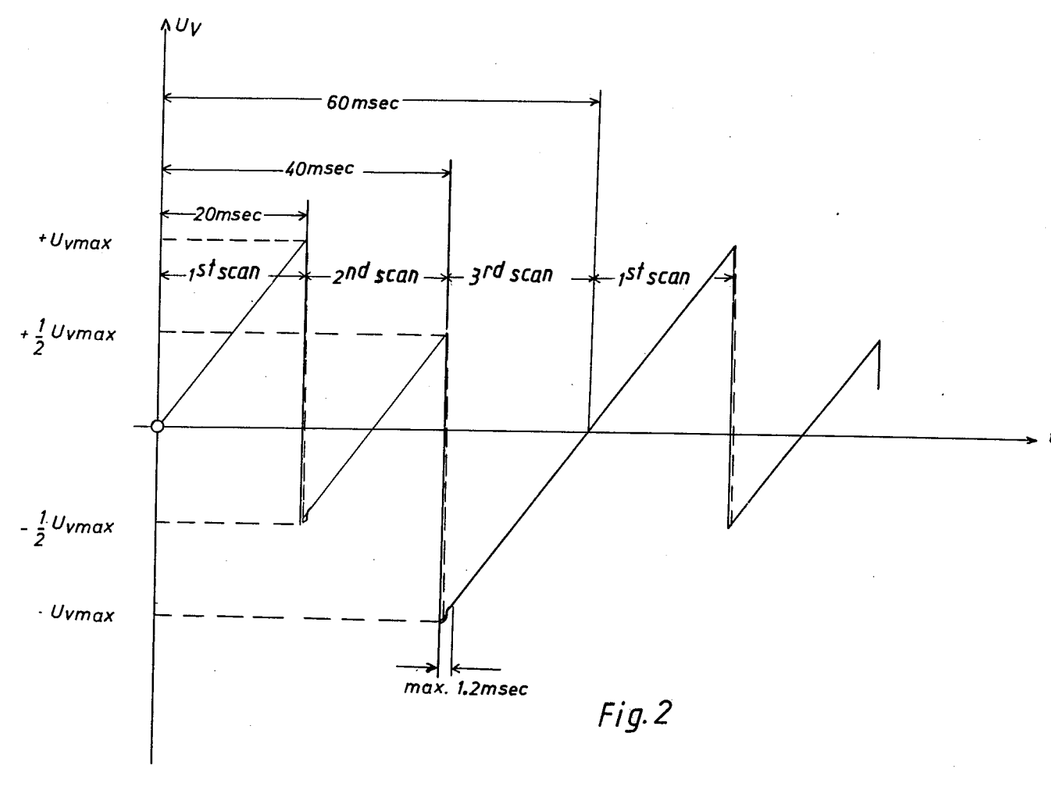
FIG. 2 is a voltage-versus-time graph depicting the voltage used to deflect the tilting mirror system of FIG. 1.

The moving-coil vibrator S is driven by an additive logic circuit 5 through the intermediary of an amplifier 6. FIG. 2 depicts the composite sawtooth signal utilized to drive the moving-coil vibrator S for the scanning of Super-8 film which has been shot at 18 frames/sec. The illustrated deflection-control voltage can easily be obtained by mere superposition of a sawtooth voltage waveform onto an appropriate stepped rectangular waveform. Likewise, the sawtooth waveform employed can be preemphasized or predistorted to correct for optical error in the film projection and scanning system, e.g., tangential optical error.

Figure 3:
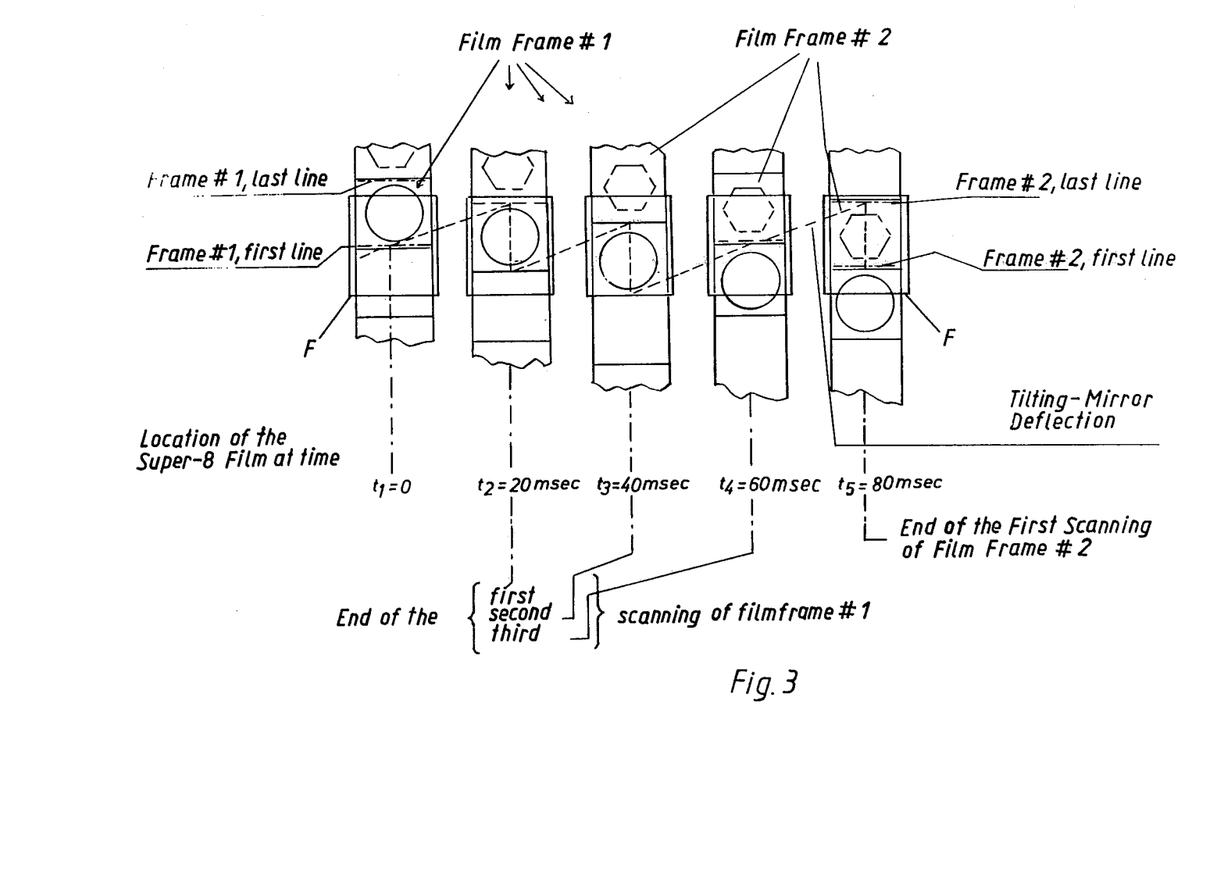
FIG. 3 is an explanatory diagram indicating the sequence of scanning motions and relatively displaced positions occurring with the tilting mirror deflection system of the preferred embodiment.

To facilitate visualization of the vertical-direction scanning motion performed by the tilting mirror system, FIG. 3 depicts the spatial relationships between film frames and the deflecting mirror of the tilting mirror system at successive instands spaced in time 20 msec from one to the next, 20 msec being required for one vertical-direction scanning operation, i.e., for one TV field. Two film frames are to be discussed, the first denoted #1 with its image content symbolized by a circle, the second denoted #2 with its image content symbolized by a hexagon.

At $t = t_1 = 0$, the first image line of film frame #1 is being projected onto the photodiode-row of image-sensing system 3.

During the 20 msec between $t_1 = 0$ and $t_2 = 20$ msec, the successive image lines of film frame #1 will have been, one by one, projected onto the photodiode-row. This is indicated in FIG. 3 by the inclined broken line, which forms part of a broken-line sawtooth waveform of the same configuration as the deflection-control voltage depicted in FIG. 2.

By time $t_2 = 20$ msec, the first scanning of film frame #1 will be completed, i.e., the last image line of film frame #1 being projected onto the photodiode-row at this time. It will be noted that, in the time interval from $t_1$ to $t_2$, film frame #1 itself has moved downward an amount equal to only ⅓ of its vertical-direction length. Accordingly, in the illustrated embodiment, ⅓ of the relative displacement between film frame and deflecting system needed for one vertical-direction scanning operation results from mere film transport, with the remaining ⅔ of this relative displacement resulting from the deflection performed by the tilting mirror system; it will be understood that both components of motion occur simultaneously and have an additive effect.

At $t_2 = 20$ msec, the flyback or tiltback of the deflecting mirror commences, the vertical section of the broken-line sawtooth in FIG. 3 representing this. At the end of this flyback, and as shown in FIG. 3, it is once again the first image line of film frame #1 which is being projected onto the photodiode-row. Because the flyback or tiltback occurs, in theory, instantaneously (although in the concrete example here offered requires a time of no more than 1.2 msec), the distance through which the deflecting mirror's galvanometric coil S must swing for the tiltback corresponds to substantially the full vertical-direction length of one film frame. This is shown in FIG. 3, at $t_3$, the vertical section of the broken-line sawtooth, it being seen that the upper end of this broken-line section is at the last image line of film frame #1 and the lower end of this broken-line section again at the first image line of film frame #1.

Between $t_2 = 20$ msec and $t_3 = 40$ msec, the second vertical-direction scanning of film frame #1 is performed. At the end of this second scanning operation, i.e., at $t_3$, it is again the last image line of film frame #1 which is being projected onto the photodiode-row, and film frame #1 has meanwhile moved downward once again a distance equal to ⅓ of its vertical-direction length. There then occurs another flyback or tiltback of the deflecting mirror.

Between $t_3 = 40$ msec and $t_4 = 60$ msec, the third vertical-direction scanning of film frame #1 is performed. At $t_4$, this third scanning of film frame #1 is finished, and the last image line of frame #1, or equivalently the first image line of frame #2, is being projected onto the photodiode-row.

At the end of this third scanning of film frame #1, i.e., at $t_4$, no flyback or tiltback occurs. Instead, the first image line of film frame #2 is now located relative to the deflecting system in the same way as was the first image line of film frame #1 at time $t_1 = 0$, and the forwards-scanning motion of the deflecting mirror which occurred between time $t_3$ and time $t_4$ now merely continues in the same direction from $t_4$ to $t_5 = 80$ msec. I.e., between $t_4$ and $t_5$ there now occurs the first scanning of film frame #2.

Actually, at $t_4$, there may not be complete identity between the last image line of film frame #1 and the first image line of film frame #2. The small discrepancy can be compensated for by introducing, into the rectangular step waveform upon which the sawtooth waveform of FIG. 2 is built, a further and corresponding compensatory step. In FIG. 2, whereas the deflection-control sawtooth voltage waveform is shown in solid lines, the motion of the deflecting mirror, during the flyback or tiltback times, is shown in broken lines. Also, at the bottom point of each tooth of the sawtooth waveform, there is indicated the limited upwards transient overshoot which occurs when, at the end of the tiltback, forwards-scanning motion resumes. In FIG. 3, F denotes the image window for the light source of the illumination and film transport system 1.

With regard to the image-sensing system 3 with its bucket-brigade circuit or CCD, including its photodiode-row and the associated decoding logic circuit 8 for the three color component signals red, green and blue, it suffices to describe the units just mentioned, inasmuch as the other signal-processing circuitry incidental to the generation of a complete composite color-T.V. picture signal modulated onto an HF carrier is extremely well known in the television art.

Figures 4, 5:
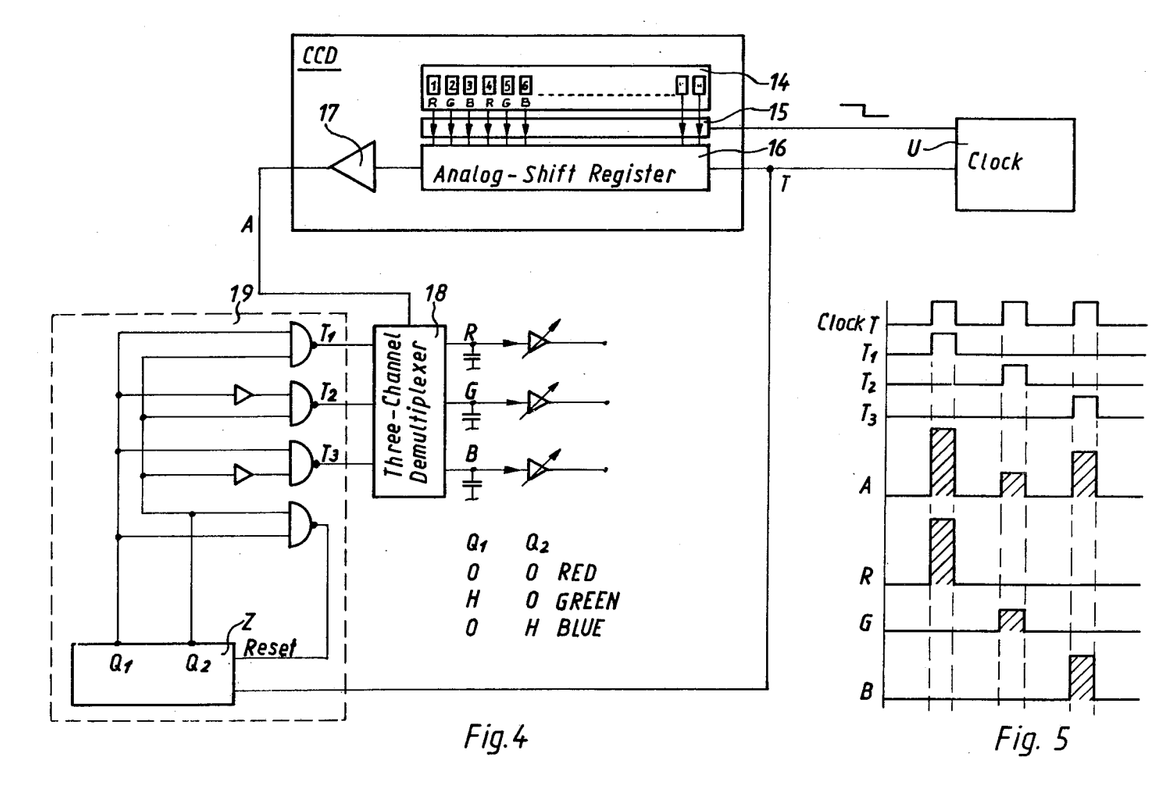
FIG. 4 depicts one embodiment of the optoelectronic and electronic parts of the system up to the point of generation of the three color component signals needed for T.V. reproduction.
FIG. 5 depicts a set of pulse diagrams referred to in connection with explanation of the operation of the circuitry of FIG. 4.

FIG. 4 depicts a first exemplary embodiment of an image-sensing system 3 operative for obtaining the separate color component signals by means of time-demultiplexing. The bucket-brigade circuit or CCD comprises a single row 14 of photodiodes, the individual ones of which are connected, through the intermediary of a transfer gate 15, to the inputs of respective stages of an analog shift register 16. A clock signal generator U supplies control signals for activating transfer gate 15, and furthermore supplies clock signals T for driving the analog shift register 16. The output circuitry of the analog shift register 16 comprises a charge amplifier 17, at whose output there serially appears a color signal A containing all three color components of each successive image point. Color signal A is applied to the input of a three-channel demultiplexer 18, at whose three outputs there respectively appear the color component signals R, G and B. Operation of the demultiplexer 18 is controlled by an associated decoder logic circuit 19 comprised of a two-bit counter Z and a network of inverters and NAND-gates as shown.

The photosensitive part of the bucket-brigade circuit (CCD) comprises a photodiode-row 14 having, e.g., 1200 silicon photodiodes arranged in a single row, at intervals of for example 13 microns with the total length of the photodiode-row amounting to 15.6 mm. The projection objective of the illumination and film-transport system 1 is so designed that the projected image of one image line of a film frame is enlarged to equal the length of photodiode-row 14. The deflecting mirror should be so spaced from the photodiode-row 14 that it be able to scan along the length of the film a distance equal to 1⅔ of the vertical-direction length of one film frame without exceeding its permissible limits of tilting motion. Also, this spacing should be kept as large as possible, in order to keep low tangential error in the projection of the film-frame image.

For example, at $t = t_1 = 0$ in FIG. 3, the first image line of film frame #1 is imaged onto the photodiode-row 14, and the flank of a control pulse produced by clock generator U briefly activates the transfer gate 15 and the individual brightness signals stored by the individual photodiodes (each photodiode being provided with a respective storage capacitor) are transferred to respective individual stages of the analog shift register 16, in parallel. This accomplished, the clock pulses T from clock generator U drive the stored contents of the shift register 16 to the terminal stage thereof serially, and via charge amplifier 17 the aforementioned color signal A is available at the output terminal of the CCD.

The frequency of the clock pulses T is so selected that the contents of the analog shift register 16 be read out in a time interval whose duration exactly equals the time required for the horizontal sweep of one video image line (52.5 microseconds in the European system). In a black-and-white context, such a signal could be directly employed as the picture signal, although the addition of synch pulses would of course still be necessary to form a complete composite T.V. signal. In a black-and-white context it would suffice to use only one-third as many photodiodes, e.g., 400; for color, it would in principle be possible to use three such 400-photodiode photodiode-rows in combination with a beam-splitting system comprised of dichroic mirrors and color filters.

However, in the embodiment here disclosed only one single photodiode-row 14 is used at all, and with three times as many photodiodes as would be required for each such photodiode-row if three were employed with a beam-spitting system. Within photodiode-row 14, one photodiode is sensitive to wavelengths destined for the red color component signal, the next for wavelengths destined for the green color component signal, and the next for blue, and so forth, repeatedly; or the periodic succession of the three different color sensitivities could be in a different order, red, blue, green, red, etc. This sequence of sensitivities can be implemented by deposition of differing interference layers onto the photodiode-row during the production of the photodiode-row; such masks are conventional in IC production technology. Alternatively, the photodiodes of the photodiode-row can all be of the same spectral response, but with the photodiode-row having provided in front of it a stripe filter whose successive constituent elements are transmissive for the wavelengths for the red signal, for the blue signal, for the green signal, and so forth. Accordingly, each image point is defined by three color component images arranged one after the other in the direction in which the photodiode-row itself extends. Actually, such an approach is positively advantageous for modern in-line color picture tubes, because these likewise reproduce the three color-component points of a color image point in straight-line spatial succession.

At the output of the CCD there serially appears the color signal A, constituted in succession by the red, green and blue color component signal for each successive image point. This signal is transformed into the parallel color component signals R, G, B by means of the three-channel demultiplexer 18 and the associated decoding logic circuitry 19. Demultiplexer 18 routes the color component signals R, G, B in turn to successive ones of its three correspondingly denoted outputs R, G, B where, for example, there are provided respective capacitors for holding the received color component signal until updated by the arrival of the next color component signal of the same color. The frequency of the clock generator U is, as already stated, so selected that the contents of the analog shift register 16 is fully read out in the time required (52.5 microseconds) for the sweeping of one horizontal video image line. In the concrete example here given, the number of photodiodes in the photodiode-row is 1200, and accordingly the requisite clock frequency of clock generator U is $$f = \frac{1200}{52.5 \cdot 10^{-6}} \text{ Hz} \approx 23 \text{ MHz}.$$

Bucket-brigade circuits or CCD's capable of operating with such a clock frequency are commercially available.

Figure 6:
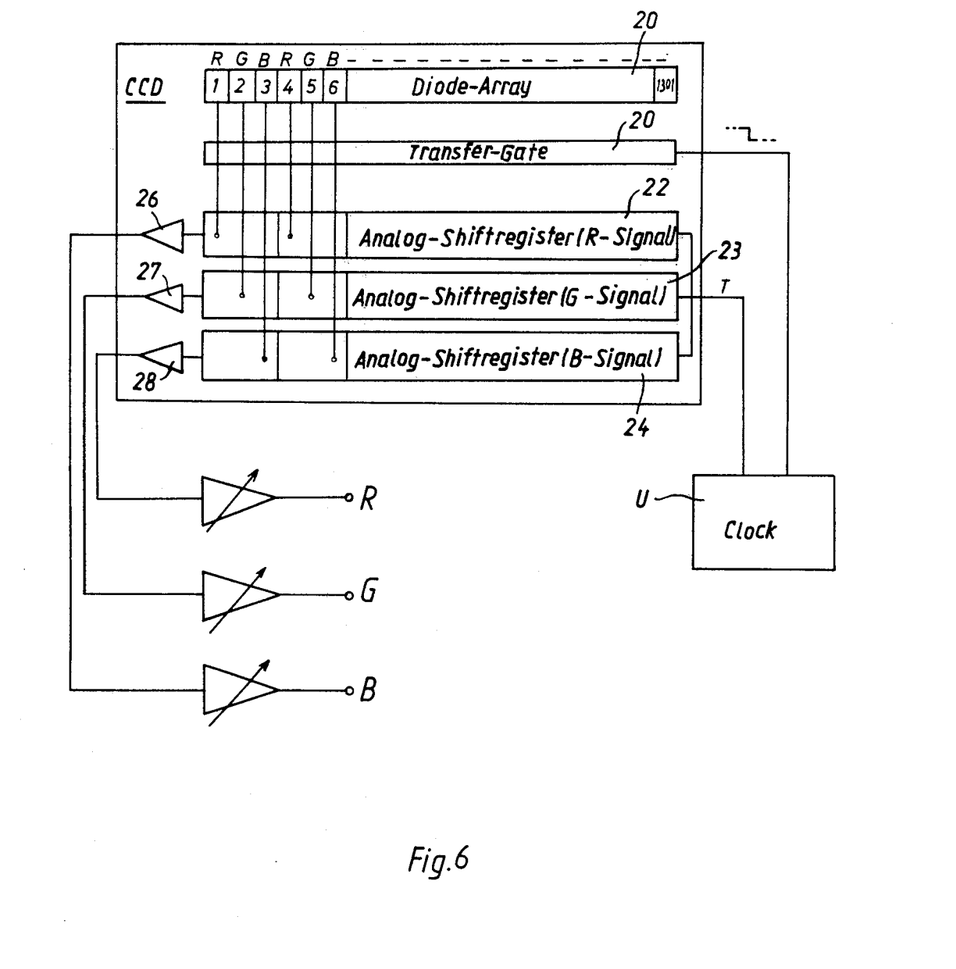
FIG. 6 depicts an embodiment alternative to FIG. 4.

FIG. 6 depicts an alternative embodiment for the image-sensing system 3, utilizing a lower clock frequency but being more demanding upon IC production technique because of the provision of three analog shift registers on a single CCD chip.

The photodiode-row 20 of the bucket-brigade circuit (CCD) is exactly the same as photodiode row 14 of FIG. 4. As shown in FIG. 6, here however the signal from each individual photodiode is transmitted by a transfer gate 20 to a respective one of three analog shift registers 22, 23, 24, each analog shift register receiving signals from only those photodiodes which are responsive to a single respective one of the three component colors involved. I.e., one shift register is provided for all those photodiodes which are responsive to the red-signal wavelengths, the second for all those responsive to the green-signal wavelengths, and the third for those responsive to the blue-signal wavelengths. However, transfer gate 21, as before, transmits all the photodiode voltages in parallel and simultaneously.

The read-out of the three analog shift registers 22, 23, 24 is performed with one and the same clock frequency for each register, so that the three color component signals R, G, B are already available at the external outputs of the three associated charge amplifiers 26, 27, 28 of the CCD. Accordingly, the three color component signals can be rather directly applied to ordinary circuitry for conversion into a complete composite color-T.V. signal. The clock frequency required to read out the three shift registers is exactly one-third of that required for the image-sensing system of FIG. 4, inasmuch as each clock pulse from clock generator U effects the simultaneous read-out of the three color components of one image point. With 400 stages per shift register, the requisite frequency for clock generator U becomes $$f = \frac{400}{52.5 \cdot 10^{-6}} \text{ Hz} \approx 7.5 \text{ Mz}.$$

Figure 7:
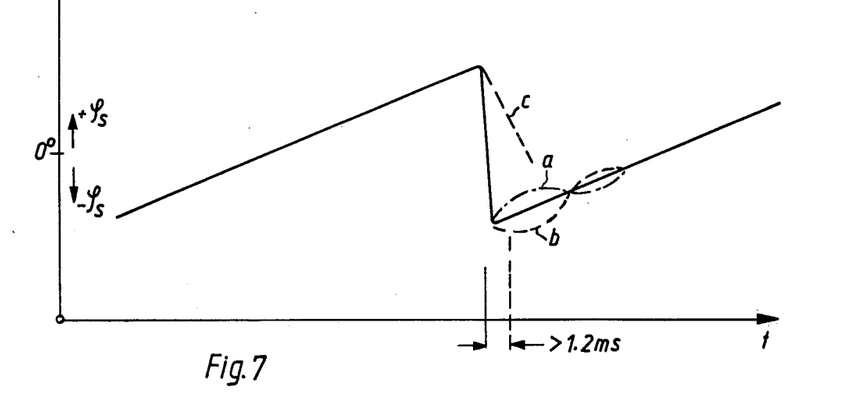
FIG. 7 depicts the angular position ($\phi_s$) of the tilting mirror of a scanning system for Super-8 film as a function of time.

FIG. 7 depicts in somewhat greater detail the angular tilt $\phi_s$ which the mirror of the tilting mirror deflection system must perform for the vertical-direction displacement of the film-frame image as projected onto the photodiode-row, each interval during which the mirror's angular position moves towards an extreme corresponding to one T.V. field. As indicated by the solid-line sawtooth in FIG. 7, the time required for the flyback or tiltback per se, plus the time involved in the subsequent transient during direction reversal for the next forwards-scanning motion, requires no more than 1.2 msec, so that the forwards-scanning motion follow substantially immediately upon the completion of the flyback per se. The dash-dot-dash curve a indicates the course which the post-flyback transient deflection of the deflection mirror would take, if the braking action imposed to effect the direction-reversal from flyback to forwards motion were made too strong. The broken-line curve b indicates what the transient deflection would be if the direction-reversal braking action were too weak. Broken line c indicates the flyback which would result if the direction-reversal acceleration leading to flyback were insufficiently forceful.

Upon completion of the forwards motion of the tilting mirror, a considerable negative current pulse is necessary, to positively and forcefully reverse the direction of the mirror and initiate the flyback. Indeed, the amount of direction-reversal energy imposed upon the galvanometric system should be as high as possible, limited only by the electromechanical load which the galvanometric system can safely withstand. This negative current pulse results in very considerable mirror velocity by the end of the flyback or tiltback, so that the mirror must at this point be strongly braked and then accelerated in the opposite direction for its next forward motion. This braking and acceleration up to forwards-motion speed requires a positive voltage pulse 110 which follows almost immediately upon the negative voltage pulse 109. By carefully adjusting the positive pulse with respect to its amplitude, duration and the time of its occurrence, it is possible to effect an extremely fast and overshoot-free direction reversal for resumption of forwards-scanning motion, i.e., so that the displaced position of the tilting mirror as a function of time be a sawtooth function the two flanks of each tooth of which are of greatly different slope.

Figure 8:
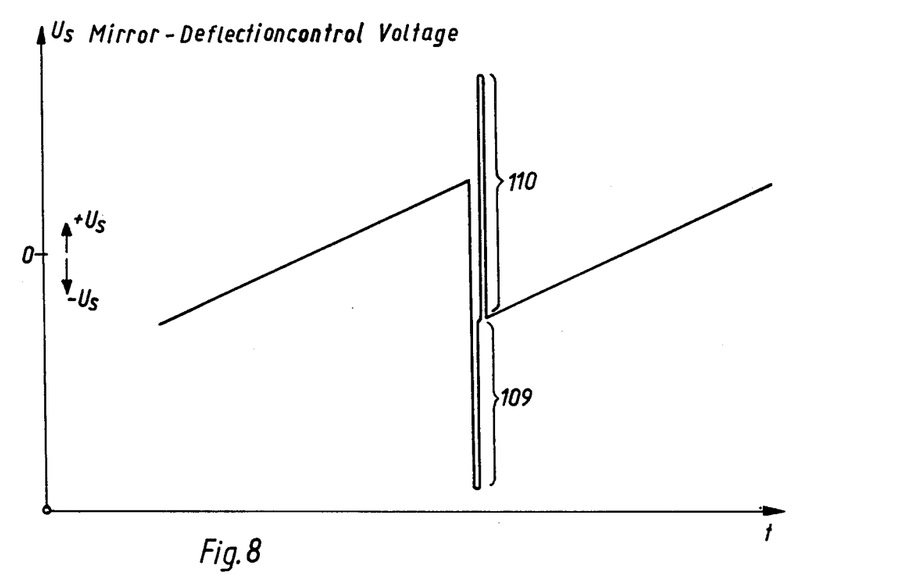
FIG. 8 depicts as a function of time the deflection-control voltage $U_s$ used to drive the galvanometric tilting mirror system.
Figure 9:
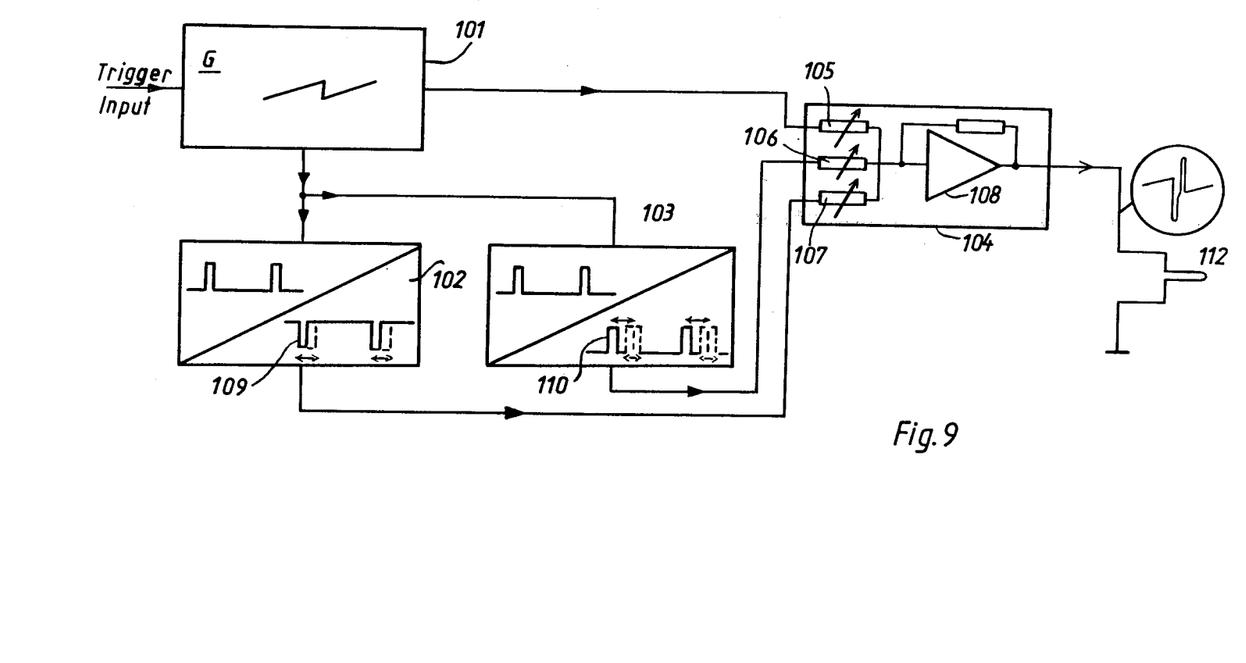
FIG. 9 depicts a control circuit operative for generating the control voltage used to drive the galvanometric tilting mirror system.

FIG. 9 depicts in schematic block diagram form an electronic control circuit for producing the control voltage $U_s$ depicted in FIG. 8. The illustrated circuitry comprises a sawtooth generator 101 having a rising flank of constant slope and a falling flank of extremely steep slope; it will be understood that sawtooth generators are standard elements, the internal configuration of which need not be discussed here. During the falling flank of the sawtooth, sawtooth generator 101 furnishes a brief pulse to a pulse former stage 102, the latter being operative for generating the negative direction-reversing pulse which initiate tiltback; and furthermore furnishes a brief pulse to a pulse former stage 102, the latter being operative for generating the positive direction-reversing pulse which brakes the tiltback and initiates resumption of forwards-scanning motion. Pulse former stage 102 comprises, for example, a monostable multivibrator, it being easy with such circuits to adjust the duration of the pulse produced. The pulse former stage 102 can be comprised of two monostable multivibrators provided with two adjustment potentiometers which serve, in a familiar way, for adjustment of the time of occurrence and the duration of the output pulse produced, i.e., independently of each other. The sawtooth voltage and the two rectangular pulses produced by the pulse former stages 102, 103 are applied to an additive logic circuit here in the form of a summing amplifier 104, the amplitudes of the three input voltages applied to amplifier 104 being adjustable by means of three potentiometers 105, 106, 107. The summing amplifier 104 additionally serves as the power amplifier for the galvanometric tilting mirror deflection system 112. It is advisable to provide the summing amplifier 104 with current-limiting action, in order to protect the galvanometric system from overloading.

It will be understood that each of the elements described above, or two or more together, may also find a useful application in other types of circuits and constructions differing from the types described above.

While the invention has been illustrated and described as embodied in a in particular electronic scanning systems particularly designed for the scanning of Super-8 motion-picture film, and for deriving therefrom a color-T.V. signal configured in accordance with particular T.V. standards, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an arrangement for electronically scanning motion-picture film and deriving therefrom a color-T.V. signal, in combination, film transport means for transporting motion-picture film along a predetermined path; projecting means for projecting an image of the transported film into a predetermined image plane, the projecting means including deflecting means comprising a tilting mirror for deflecting the image projected into said predetermined plane and means including a galvanometric moving-coil mechanism causing the tilting mirror to tilt back and forth and thereby perform a vertical-direction scanning motion relative to the film with a repetition frequency equal to the vertical field frequency of a standard television signal, the tilting mirror effecting a displacement of the projected image of the film frame relative to said predetermined image plane by an amount corresponding to only a fraction of the length of the film frame, the remainder of the displacement resulting from mere film transport, the displacement of the projected image of the film frame effected by the tilting mirror corresponding to two-thirds of the length of the film frame so that the tilting mirror performs three scanning operations upon each successive film frame; image-sensing means operative for sensing the image in said predetermined image plane, including a single row of photosensitive elements located in said predetermined image plane and extending transverse to that direction within said image plane which corresponds to the film transport direction, the row of photosensitive elements comprising a succession of groups of three photosensitive elements each, the three photosensitive elements of each such group being arranged in a line which extends in the same direction in which the whole row of photosensitive elements extends, the three photosensitive elements of each such group having different respective spectral sensitivities, the three different spectral sensitivities respectively correspond to the wavelengths for a blue component signal, a red component signal, and a green component signal, and bucket-brigade or charge-coupled circuit means receiving the signals produced by the row of photosensitive elements and including register circuit means having a series of stages connected to receive the signals produced by the row of photosensitive elements and means for effecting read-out of the register circuit means.

2. The arrangement defined in claim 1, the register circuit means comprising an analog shift register comprised of shift-register stages connected to respective ones of the photosensitive elements of the row of photosensitive elements, the means for effecting read-out of the register circuit means including time-demultiplexing means connected to effect time demultiplexing of the output signal of the analog shift register and furnish three output signals derived from those photosensitive elements which have respective ones of said three different spectral sensitivities.

3. The arrangement defined in claim 1, the register circuit means comprising three analog shift registers, each shift register comprising a succession of shift-register stages connected to respective ones of those of the photosensitive elements which have a respective one of said three different spectral sensitivities.

4. The arrangement defined in claim 1, the three photosensitive elements of each group of photosensitive elements having said three different spectral sensitivities by virtue of differing respective deposited interference layers.

5. The arrangement defined in claim 1, the three photosensitive elements of each group of photosensitive elements having said three different spectral sensivies by virtue of the provision of a stripe filter located in front of the row of photosensitive elements and comprised of constituent elements which transmit differing wavelengths corresponding to said three different spectral sensitivities.

6. The arrangement defined in claim 1, the bucket-brigade or charge-coupled circuit means including a transfer gate having inputs connected to the photosensitive elements of the row of photosensitive elements and having outputs connected to the register circuit means.

7. The arrangement defined in claim 1, the means causing the tilting mirror to tilt furthermore comprising an additive logic circuit and an amplifier operative for energizing the galvanometric moving-coil mechanism.

8. The arrangement defined in claim 1, the means causing the tilting mirror to tilt furthermore comprising energizing means for applying an energizing signal to the galvanometric moving-coil mechanism, the energizing means comprising means operative for furnishing a sawtooth energizing signal the sawteeth of which have a first flank of lower slope effecting relatively slow tilting of the tilting mirror and thereby relatively slow scanning deflection and a second flank of greater slope effecting relatively fast tiltback of the mirror preliminary to renewed relatively slow scanning deflection, including a brief first pulse at the termination of the first flank which terminates the slow tilting and accelerates the mirror to tilt in the tiltback direction and a brief second pulse which terminates the tiltback and accelerates the mirror to tilt again in the direction of scanning deflection, the sum of the durations of the brief first and second pulses being at most equal to the vertical blanking period of a standard T.V. signal.

9. The arrangement defined in claim 8, furthermore including means for adjusting the amplitude of the sawtooth signal, and the amplitudes, durations and times of occurrence of the brief first and second pulses.

10. The arrangement defined in claim 8, the sum of the durations of the brief first and second pulses being at most equal to 1.2 msec.

11. In an arrangement for electronically scanning motion-picture film and deriving therefrom a color-T.V. signal, in combination, film transport means for transporting motion-picture film along a predetermined path; projecting means for projecting an image of the transported film into a predetermined image plane, the projecting means including deflecting means comprising a tilting mirror for deflecting the image projected into said predetermined image plane and means causing the tilting mirror to tilt back and forth and thereby perform a vertical-direction scanning motion relative to the film with a repetition frequency equal to the vertical field frequency of a standard television signal; image-sensing means operative for sensing the image in said predetermined image plane, including a single row of photosensitive elements located in said predetermined image plane and extending transverse to that direction within said image plane which corresponds to the film transport direction, the row of photosensitive elements comprising a succession of groups of three photosensitive elements each, the three photosensitive elements of each such group being arranged in a line which extends in the same direction in which the whole row of photosensitive elements extends, the three photosensitive elements of each such group having different respective spectral sensitivities, the three different spectral sensitivities respectively corresponding to the wavelengths for a blue component signal, a red component signal, and a green component signal, and bucket-brigade or charge-coupled circuit means receiving the signals produced by the row of photosensitive elements and including register circuit means having a series of stages connected to receive the signals produced by the row of photosensitive elements and means for effecting readout of the register circuit means, the means causing the tilting mirror to tilt comprising a galvanometric moving-coil mechanism and energizing means for applying an energizing signal to the galvanometric moving-coil mechanism, the energizing means comprising means operative for furnishing a sawtooth energizing signal the sawteeth of which have a first flank of lower slope effecting relatively slow tilting of the tilting mirror and thereby relatively slow scanning deflection and a second flank of greater slope effecting relatively fast tiltback of the mirror preliminary to renewed relatively slow scanning deflection, including a brief first pulse at the termination of the first flank which terminates the slow tilting and accelerates the mirror to tilt in the tiltback direction and a brief second pulse which terminates the tiltback and accelerates the mirror to tilt again in the direction of scanning deflection, the sum of the durations of the brief first and second pulses being at most equal to the vertical blanking period of a standard T.V. signal, the energizing means including a monostable circuit operative for generating the brief first pulse and two monostable circuits operative in conjunction for generating the second brief pulse, and including means for independently adjusting the times of occurrence and durations of the brief pulses.

* * * * *